United States Patent
Neth

(10) Patent No.: US 7,368,175 B2
(45) Date of Patent: May 6, 2008

(54) METAL BAND AS AN INLAY FOR TRIM STRIPS OR SEALING STRIPS

(75) Inventor: Walter Neth, Gerlingen (DE)

(73) Assignee: BFC Buro-und Fahrzeugtechnik GmbH & Co. Prod. KG, Remseck (Aldingen) (DE)

( * ) Notice: Subject to any disclaimer, the term of this patent is extended or adjusted under 35 U.S.C. 154(b) by 274 days.

(21) Appl. No.: 11/170,634

(22) Filed: Jun. 29, 2005

(65) Prior Publication Data
US 2006/0121303 A1    Jun. 8, 2006

(30) Foreign Application Priority Data
Dec. 6, 2004   (DE) ...................... 10 2004 058 735

(51) Int. Cl.
- B32B 3/24 (2006.01)
- B32B 3/02 (2006.01)
- B21D 25/00 (2006.01)
- B21D 28/26 (2006.01)
- B21B 5/00 (2006.01)

(52) U.S. Cl. ...................... 428/573; 428/596; 428/597; 428/601; 52/670; 52/671

(58) Field of Classification Search ...................... None
See application file for complete search history.

(56) References Cited

U.S. PATENT DOCUMENTS

| | | | |
|---|---|---|---|
| 2,290,842 A | 7/1942 | Bush | |
| 5,199,142 A | 4/1993 | Davis | 29/6.1 |
| 5,302,466 A | 4/1994 | Davis et al. | 428/573 |
| 5,783,312 A | 7/1998 | Laughman et al. | 428/573 |
| 6,079,160 A | 6/2000 | Bonds | 49/490.1 |
| 6,447,928 B2 | 9/2002 | Suitts | 428/573 |
| 6,532,787 B2 | 3/2003 | Suitts | 72/185 |

FOREIGN PATENT DOCUMENTS

CA    2 296 203    1/2000

(Continued)

OTHER PUBLICATIONS

European Search Report and English Language Translation dated Aug. 2, 2007. European Patent Appl. No. 05025897.9.

Primary Examiner—John J. Zimmerman
Assistant Examiner—Jason L Savage
(74) Attorney, Agent, or Firm—Gifford, Krass, Sprinkle, Anderson & Citkowski, PC

(57) ABSTRACT

A metal band as an inlay for trim strips or sealing strips of flexible material, in particular of rubber or plastic, which is in particular bent to form a shape, having a plurality of slots, in particular periodically sequential slots in the longitudinal direction of the band which are directed inwardly from an edge of the metal band transversely to its longitudinal direction, which are wedge shaped or which run out inwardly in wedge shape, and also having central slots which run out to a tip at their two ends, which are arranged between sequential edge slots in the longitudinal direction and which likewise extend transversely to the longitudinal direction of the metal band, but do not extend up to the edge, wherein at least two sequential central slots in the longitudinal direction of the metal band are arranged between two sequential edge slots to improve the band properties.

20 Claims, 1 Drawing Sheet

FOREIGN PATENT DOCUMENTS

| | | |
|---|---|---|
| CA | 2 075 679 | 5/2000 |
| DE | 8619573 | 11/1986 |
| DE | 10124484 | 11/2002 |
| EP | 0473123 | 3/1992 |
| EP | 9 531 115 A1 | 3/1993 |
| EP | 0884209 | 12/1998 |
| FR | 2509825 | 1/1983 |
| FR | 2852074 | 9/2004 |
| GB | 1 415 595 | 1/1973 |

… # METAL BAND AS AN INLAY FOR TRIM STRIPS OR SEALING STRIPS

RELATED APPLICATION

This application claims priority of German Patent Application No. 10 2004 058 735.3 filed Dec. 6, 2004.

FIELD OF THE INVENTION

The present invention relates to a metal band as an inlay for trim strips or sealing strips of flexible material, in particular of rubber or plastic, which is in particular bent to form a section, having a plurality of slots, in particular periodically sequential slots in the longitudinal direction of the band which are directed inwardly from an edge of the metal band transversely to its longitudinal direction, which are wedge shaped or which run out inwardly in wedge shape, and also having central slots which run out to a tip at their two ends, which are arranged between sequential edge slots in the longitudinal direction and which likewise extend transversely to the longitudinal direction of the metal band, but do not extend up to the edge.

BACKGROUND OF THE INVENTION

Metal bands of this type are in particular used in the automotive sector as inlays for sealing strips to seal openings of the engine compartment, trunk or door. The continuously produced metal bands are jacketed by rubber and/or flexible plastic and have slots in order, among other things, to permit a penetration of the sealing material with metal bands not coated with an adhesive means, since the adhesion of rubber to metal or plastic to metal is not possible. On the other hand, metal bands coated with an adhesive means are very expensive. The metal bands can be advantageously manufactured by rotary cutting of the slots and be expanded by subsequent rolling of the metal band, namely without waste and at a high production speed.

Before or after the jacketing with the sealing material, the metal bands are bent to a usually U-shaped clamping section, which is clamped onto the sealing flanges of the opening. To allow the contours of the opening to be followed in this process, the clamping section must usually be flexible both in the horizontal and in the vertical plane. In addition, the clamping section should be compressible in the longitudinal direction, since the openings to be sealed can have substantial peripheral tolerances and a cutting to length of the sealing strip on site would be extremely time-consuming and/or expensive. Sealing strips having a compressible clamping section can namely preferably be produced endlessly to the maximum length which occurs and be compressed to the actual length on installation. Bonding or vulcanizing these sealing strips together or the like therefore does not have to take place on site so that the sealing strip installation can also be carried out by robots.

On the other hand, the clamping section must also have a specific tensile strength, since the trim strips or sealing strips are usually manufactured by extrusion, with substantial forces occurring in the longitudinal direction of the band. A further requirement of the clamping section consists of exerting a clamping force which is as large as possible on the sealing flanges.

SUMMARY OF THE PRESENT INVENTION

It is the underlying object of the invention to improve a metal band of the initially named kind. Material and thus weight should in particular be saved and the manufacture made cheaper. The flexibility of the band should also be improved.

This object is satisfied in that at least two sequential central slots in the longitudinal direction of the metal band are arranged between two sequential edge slots.

Material and thus weight and costs can be saved by the arrangement of two respective central slots between sequential edge slots. When the metal band is expanded, the two respective central slots namely behave like a slot with a central web. The width of the two central slots is therefore approximately only half as large as the width of the edge slots after the expansion. The band can therefore be expanded approximately twice as much, without gaps arising in the region of the central slots which are too large and which would result in an irregular surface on coating with rubber or plastic, the so-called hungry horse effect.

The possible large width of the edge slots furthermore has the advantage that the band thereby receives increased flexibility and it can therefore be used for extremely tight radii of the sealing section such as with sunroofs where a lot of rubber or plastic should be present between the teeth. No coupling agent is required either due to the two respective central slots. This also results in a lowering of the costs and the time effort in manufacture. The band also has a good compressibility, whereby the advantages initially mentioned result.

The edge slots are preferably arranged in pairs in that two respective oppositely directed edge slots are inwardly directed from the two edges of the metal band. A flexible band with high clamping force hereby results.

Furthermore, two central slots are arranged sequentially in the longitudinal direction of the metal band, in particular between all sequential edge slots, in particular between all pairs of edge slots. A continuous band with a homogeneous surface thereby results.

In accordance with an embodiment of the invention, the edge slots and the central slots overlap one another in the transverse direction of the metal band. A particularly high flexibility and compressibility thereby results.

A particularly advantageous metal band results when the edge slots and the central slots only overlap slightly, in particular when the edge slots each extend over approximately four tenths of the band width and the central slots each extend over approximately a third of the band width. Other relationships are, however, also generally possible.

To realize particularly wide metal bands, it is advantageous for two or more central slots to be arranged at least partly next to one another. A wide central region having a smooth surface and a good anchoring can thereby also be achieved without a coupling agent.

A particularly uniform surface moreover results when the shape and size of the central slots arranged sequentially and/or next to one another are identical.

The edge slots can also each extend only over approximately a third of the band width and at least one additional central slot, whose two ends each run out into a tip, can be arranged between oppositely directed edge slots. This embodiment is in particular advantageous with particularly wide metal bands in order to combine sufficient tensile strength with high flexibility and compressibility and also to ensure good anchoring in the wide central region.

The central slots can in particular have a trapezoidal shape and the additional central slots can have the shape of a double trapezoid. This also promotes the compressibility and is advantageous with respect to a smooth surface with a simultaneously good anchoring of the rubber material or plastic material to the metal band.

The manufacture of the slots preferably takes place by cutting and subsequent expansion by rolling. Very high production speeds can thus be achieved. The manufacture is moreover possible without waste and the opening width of the slots can be varied as required. The edge slots can in particular be expanded approximately twice as much as the central slots arranged between them in the longitudinal band direction. Finally, all other dimensions such as the width of the central slots, web width, tooth width and band width can also be varied without problem.

BRIEF DESCRIPTION OF THE DRAWING

Non-restricting embodiments of the invention are shown in the drawing and will be described in the following. There are shown, schematically in each case.

DETAILED DESCRIPTION OF THE INVENTION

Figure 1:
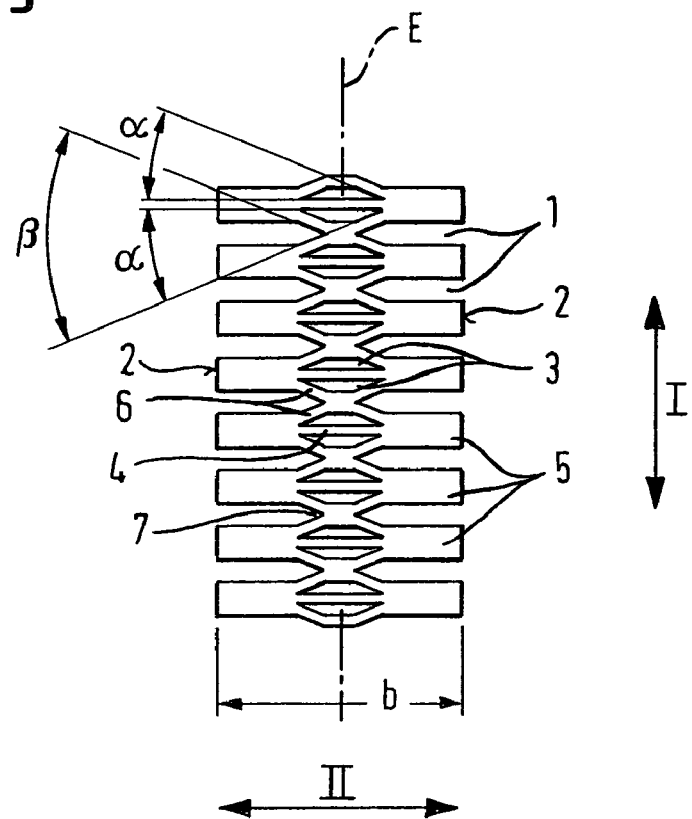
FIG. 1 a first variant of a metal band in accordance with the invention in plan view.

The metal band which is shown in FIG. 1 and which can be used as an inlay for trim strips or sealing strips of a flexible material, in particular of rubber or plastic, has a plurality of edge slots 1 which are periodically sequential in the longitudinal direction I of the band and are inwardly directed from the two edges 2 of the metal band oppositely directed to one another in pairs. The edge slots 1 each extend over approximately four tenths of the width b of the metal band. The metal band furthermore has two respective central slots 3 between two sequential pairs of edge slots 1, said central slots being sequential in the longitudinal direction I of the metal band and extending in each case over approximately a third of the band width b. The central slots 3 thereby overlap the edge slots 1 in the transverse direction II of the metal band.

The edge slots 1 are manufactured by cutting and expansion by rolling and have a shape running out into a wedge tip 7 on the inner side of the band. The central slots 3 are likewise manufactured by cutting and expansion by rolling and each have a trapezoidal shape. The two central slots 3 arranged between two sequential pairs of edge slots 1 are aligned oppositely in this process. A central web 4 is located between them which connects the teeth 5 together which are formed by the edge slots 1 at both edges of the metal band. As can be recognized, teeth 5 sequential in the longitudinal direction I of the band are likewise connected to one another via narrow webs 6 by the forming of the edge slots 1 and the central slots 3. High flexibility and compressibility of the metal band hereby results with a nevertheless sufficient tensile strength for the extrusion.

In the embodiment shown, the edge slots 1 and the central slots 3 are arranged symmetrically to the central longitudinal plane E of the metal band. An asymmetric arrangement would, however, likewise be possible. Different flexibility in opposite directions of bending can thereby be achieved.

The central slots 3 have an opening angle a of trapezoidal shape which is approximately half as large as the opening angle β of the wedge tips 7 of the edge slots 1. The expansion of the edge slots 1 is thereby approximately twice as large as the expansion of the central slots 3.

Figure 2:
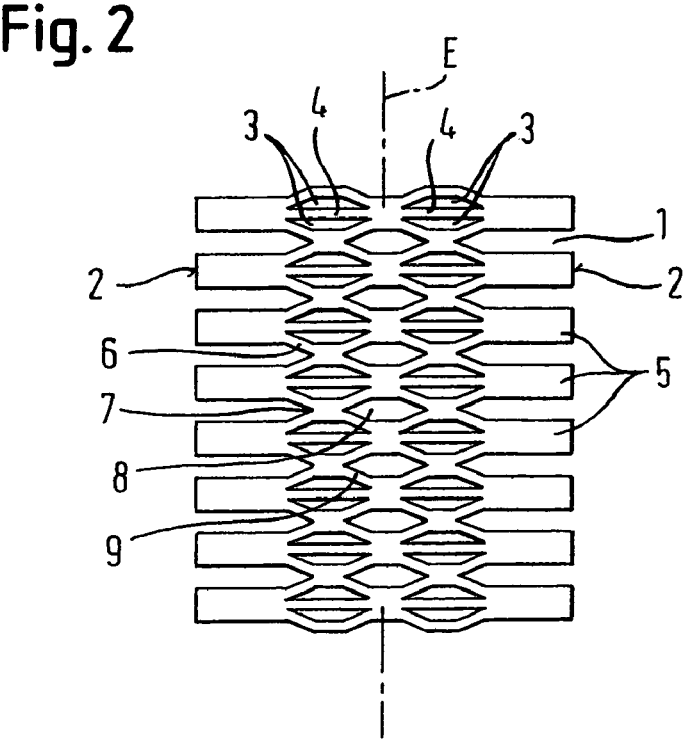
FIG. 2 a second variant of a metal band in accordance with the invention in plan view.

The metal band shown in FIG. 2 is wider than that shown in FIG. 1. The central region between the wedge tips 7 of the edge slots 1 is in particular enlarged. Two respective central slots 3 are arranged next to one another for balance. This means that two pairs of central slots 3 arranged next to one another are located sequentially in the longitudinal direction I of the band between two sequential pairs of edge slots 1.

A respective web 4 is again present between the sequentially arranged central slots 3. In addition, additional central slots 8, which have the shape of a double trapezoid, are arranged between the wedge tips 7 of the edge slots 1 of each pair. Further narrow webs 9 are thereby formed between sequential teeth 5 of the band. A wide band results having high flexibility and compressibility and a uniform smooth surface which permits a good anchoring without a coupling agent.

In this variant, too, the slots 1, 3 and 8 are manufactured by cutting and expansion by rolling. The edge slots 1 again have approximately twice the width of the central slots 3. The additional central slots 8 have approximately the same width as the edge slots 1. Finally, the arrangement of the slots 1, 3 and 8 is here also symmetrical to the central longitudinal plane E of the band, but could also be provided in asymmetric form.

The invention claimed is:

1. A metal band as an inlay for trim strips or sealing strips of flexible material having a plurality of edge slots which are directed inwardly from an edge of the metal band transversely to its longitudinal direction and which are wedge shaped or which run out inwardly in wedge shape, and also having a plurality of central slots which run out to a tip at their two ends and which likewise extend transversely to the longitudinal direction of the metal band, but do not extend up to the edge, wherein said edge slots and said central slots are each arranged periodically successive in the longitudinal direction of the band, said edge slots and said central slots being alternatingly arranged such that between each two of said successive edge slots at least two of said successive central slots are arranged succeeding each other in the longitudinal direction of the band.

2. The metal band of claim 1, wherein said edge slots are arranged in pairs in that two respective oppositely directed edge slots are inwardly directed from the two edges of the metal band.

3. The metal band of claim 2, wherein said edge slots each extend over approximately four tenths of the band width.

4. The metal band of claim 2, wherein said central slots each extend over approximately a third of the band width.

5. The metal band of claim 2, wherein said edge slots each extend over approximately only a third of the band width; and wherein at least one additional central slot, whose two ends each run out into a tip, is arranged between mutually oppositely disposed edge slots.

6. The metal band of claim 5, wherein the additional central slots have the form of a hexagon.

7. The metal band of claim 1, wherein two successive central slots are arranged succeeding each other in the longitudinal direction of the metal band, between each two successive edge slots.

8. The metal band of claim 1, wherein said edge slots and said central slots overlap one another in the transverse direction of the metal band.

9. The metal band of claim 8, wherein there is at least some overlap between said edge slots and said central slots.

10. The metal band of claim 1, wherein said edge slots each extend over approximately four tenths of the band width.

11. The metal band of claim 1, wherein said central slots each extend over approximately a third of the band width.

12. The metal band of claim 1, wherein two or more of said central slots are arranged next to one another in the transverse direction of the band.

13. The metal band of claim 1, wherein the shape and size of said central slots are identical.

14. The metal band of claim 1, wherein said edge slots each extend over approximately only a third of the band width; and wherein at least one additional central slot, whose two ends each run out into a tip, is arranged between mutually oppositely disposed edge slots.

15. The metal band of claim 14, wherein the additional central slots have the form of a hexagon.

16. The metal band of claim 1, wherein the central slots have a trapezoidal shape.

17. The metal band of claim 1, wherein said slots are cut and expanded by rolling.

18. The metal band of claim 17, wherein the length of said edge slots and/or said additional central slots in the longitudinal direction of the band have been expanded approximately twice as much as that of said central slots.

19. The metal band of claim 1, wherein said slots are arranged symmetrically to the central longitudinal plane of the metal band.

20. The metal band of claim 1, wherein said slots are arranged asymmetrically to the central longitudinal plane of the metal band.

* * * * *